US012621405B2

(12) United States Patent
Eng et al.

(10) Patent No.: US 12,621,405 B2
(45) Date of Patent: May 5, 2026

(54) SYSTEMS AND METHODS FOR EXPORTING VIDEO SECTIONS WITH OVERLAYS

(71) Applicant: Palantir Technologies Inc., Denver, CO (US)

(72) Inventors: Rodney Eng, Brookly, NY (US); Matthew Fedderly, Washington, DC (US); Michael Wolf, Falls Church, VA (US)

(73) Assignee: Palantir Technologies Inc., Aventura, FL (US)

( * ) Notice: Subject to any disclaimer, the term of this patent is extended or adjusted under 35 U.S.C. 154(b) by 532 days.

(21) Appl. No.: 18/102,341

(22) Filed: Jan. 27, 2023

(65) Prior Publication Data

US 2023/0247168 A1      Aug. 3, 2023

Related U.S. Application Data

(60) Provisional application No. 63/305,105, filed on Jan. 31, 2022.

(51) Int. Cl.
  *H04N 5/265*      (2006.01)
  *G06F 16/954*      (2019.01)

(52) U.S. Cl.
  CPC .......... *H04N 5/265* (2013.01); *G06F 16/954* (2019.01)

(58) Field of Classification Search
  None
  See application file for complete search history.

(56) References Cited

U.S. PATENT DOCUMENTS

| 9,092,533 | B1 * | 7/2015 | Demathieu | ......... G06F 16/9562 |
| 9,691,131 | B1 * | 6/2017 | Weisberger | ............ G09G 5/391 |
| 2017/0357655 | A1 * | 12/2017 | Marchiori | ........... G06F 3/04817 |
| 2020/0153872 | A1 * | 5/2020 | Drako | ..................... H04L 63/30 |
| 2020/0250394 | A1 * | 8/2020 | Cervelli | .................. G06F 18/24 |
| 2024/0202291 | A1 * | 6/2024 | Bae | ........................ G06F 21/128 |

OTHER PUBLICATIONS

GITHUB; muaz-khan; RecordRTC; from https://gibhut.com/muaz-khan/RecordRTC; 13 pages; Dec. 2, 2021.
Superuser; FFmpeg—Apply blur over face; from https://superuser.com/questions/901099/ffmpeg-apply-blur-over-face; 12 pages; Apr. 21, 2021.
Wowza; Set up WebRTC streaming with Wowza Streaming Engine; from www.wowza.com/docs/how-to-use-webrtc-with-wowza-streaming-engine; 13 pages; Sep. 26, 2021.
Renner, Kelly; New Ways to do Screen Capture; from https://blogs.windows.com/windowsdeveloper/author/kelly-renner/; 7 pages; Sep. 25, 2021.
GITHUB; phanan/runner.js; Record a webpage with PhantomJS and FFMpeg; from https://gist.github.com/phanan; 4 pages; Jun. 14, 2021.

* cited by examiner

Primary Examiner — Eileen M Adams
(74) Attorney, Agent, or Firm — Faegre Drinker Biddle & Reath LLP—Palantir

(57) ABSTRACT

Disclosed are systems and methods for exporting videos. In some embodiments, a method includes the steps of: accessing a video section based upon a request; generating a plurality of still images based on a plurality of video frames in the video section; playing the plurality of still images inside a web browser; and drawing one or more overlays on the plurality of still images played inside the container software to generate a set of overlaid still images. In certain embodiments, the exported video is generated based upon the set of overlaid still images.

19 Claims, 9 Drawing Sheets

200

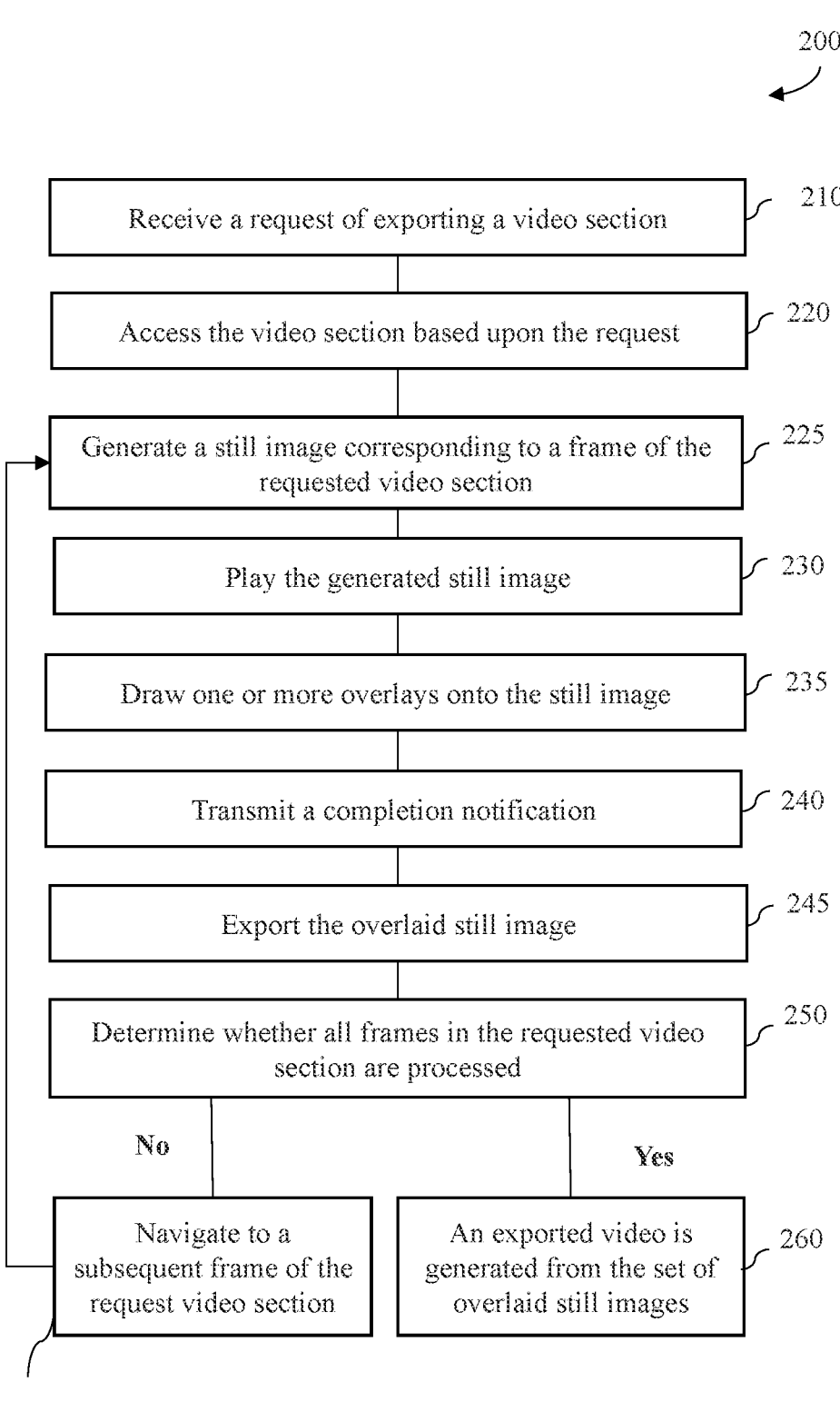

Receive a request of exporting a video section — 210

Access the video section based upon the request — 220

Generate a still image corresponding to a frame of the requested video section — 225

Play the generated still image — 230

Draw one or more overlays onto the still image — 235

Transmit a completion notification — 240

Export the overlaid still image — 245

Determine whether all frames in the requested video section are processed — 250

No

Yes

Navigate to a subsequent frame of the request video section

An exported video is generated from the set of overlaid still images — 260

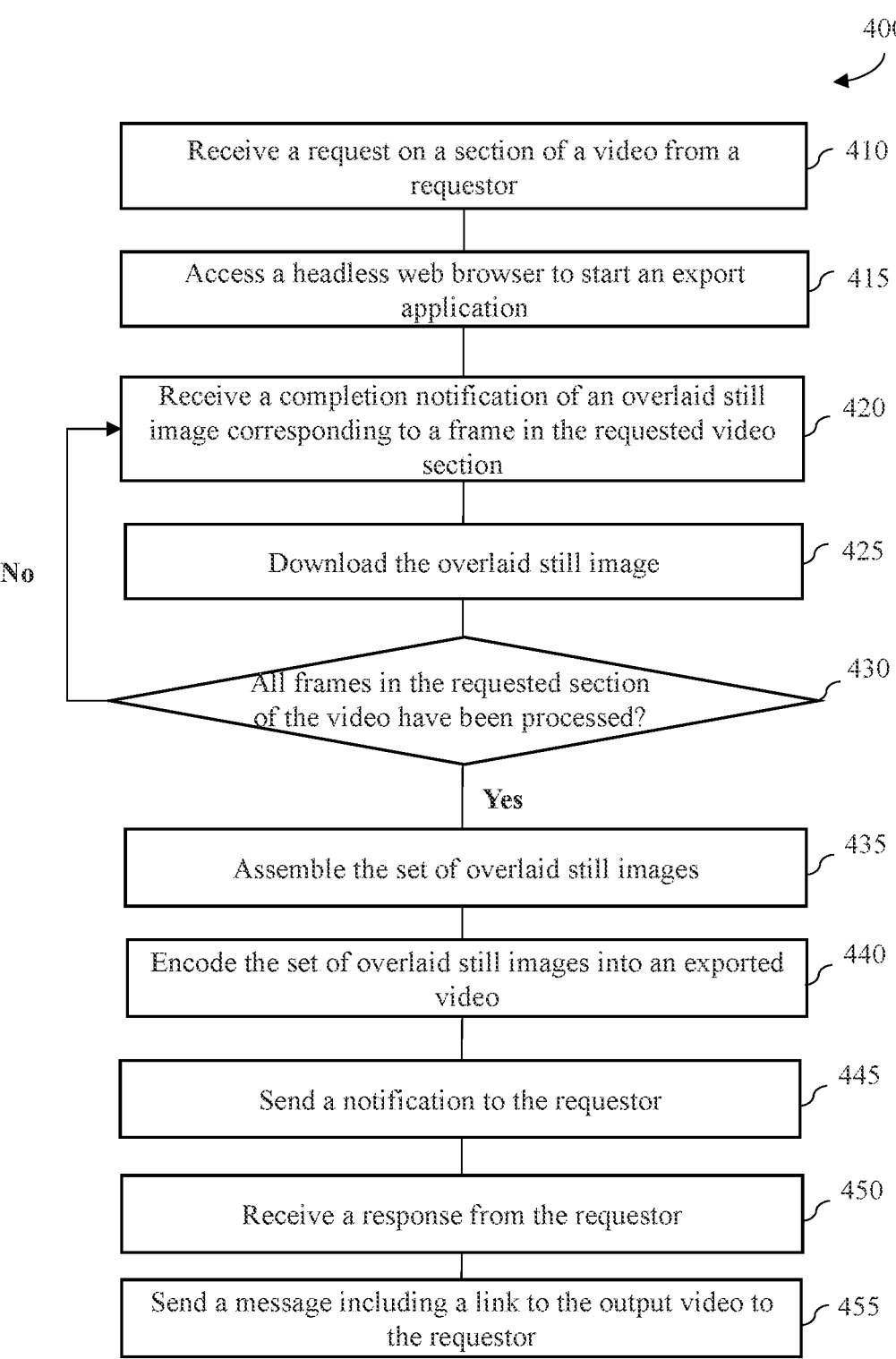

_400_

Receive a request on a section of a video from a requestor — _410_

Access a headless web browser to start an export application — _415_

Receive a completion notification of an overlaid still image corresponding to a frame in the requested video section — _420_

Download the overlaid still image — _425_

All frames in the requested section of the video have been processed? — _430_

No

Yes

Assemble the set of overlaid still images — _435_

Encode the set of overlaid still images into an exported video — _440_

Send a notification to the requestor — _445_

Receive a response from the requestor — _450_

Send a message including a link to the output video to the requestor — _455_

FIG. 4

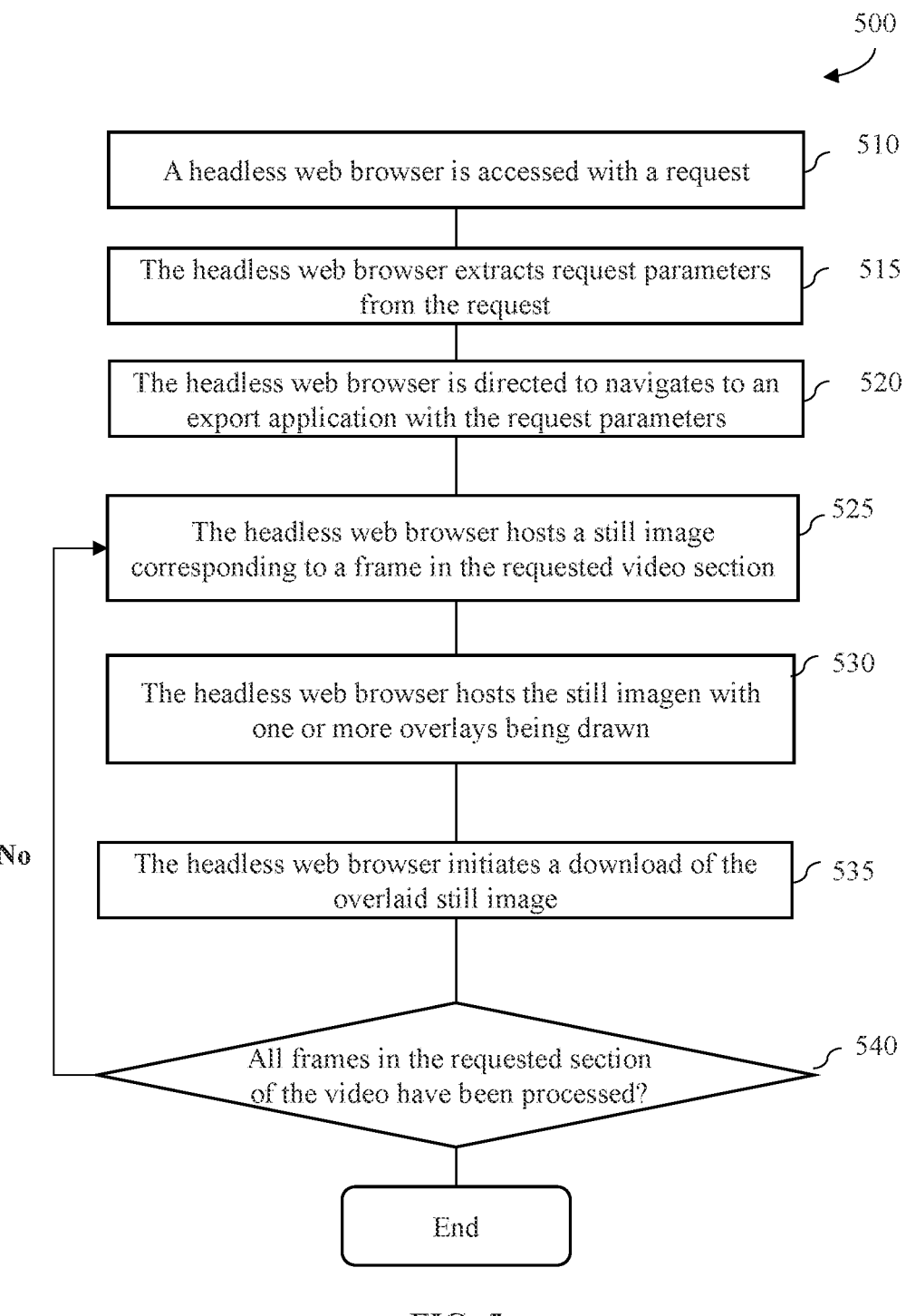

500

510 A headless web browser is accessed with a request

515 The headless web browser extracts request parameters from the request

520 The headless web browser is directed to navigates to an export application with the request parameters 525 The headless web browser hosts a still image corresponding to a frame in the requested video section 530 The headless web browser hosts the still imagen with one or more overlays being drawn 535 The headless web browser initiates a download of the overlaid still image No 540 All frames in the requested section of the video have been processed?

End

FIG. 5

SYSTEMS AND METHODS FOR EXPORTING VIDEO SECTIONS WITH OVERLAYS

RELATED APPLICATIONS

This application claims priority to U.S. Provisional Application No. 63/305,105, entitled "SYSTEMS AND METHODS FOR EXPORTING VIDEO SECTIONS WITH OVERLAYS," and filed on Jan. 31, 2022, which is incorporated by reference herein for all purposes in its entirety.

TECHNICAL FIELD

Certain embodiments of the present disclosure relate to exporting video or video sections with relevant information embedded in the videos or video sections. More particularly, some embodiments of the present disclosure relate to exporting videos or video sections with overlays.

BACKGROUND

Videos are often captured for later uses and analysis. A video usually captures one or more objects over time. A video often associates with certain information such as time, location, and object information. Videos include multiple standard formats (e.g., video encoding formats), such as MOV, MPEG, MP4 (MPEG Part 14), WMV, DVI, and AV1. Each video file format is associated with corresponding encoder and decoder.

Hence it is desirable to improve techniques for videos and/or video sections.

SUMMARY

Certain embodiments of the present disclosure relate to exporting video or video sections with relevant information embedded in the videos or video sections. More particularly, some embodiments of the present disclosure relate to exporting videos or video sections with overlays.

At least some aspects of the present disclosure are directed to a method for generating an exported video. The method includes the steps of: accessing a video section based upon a request; generating a plurality of still images based on a plurality of video frames in the video section; playing the plurality of still images inside a headless browser; and drawing one or more overlays on the plurality of still images played inside the headless browser to generate a set of overlaid still images. The exported video is generated based upon the set of overlaid still images.

At least some aspects of the present disclosure are directed to a method for generating an exported video. The method includes the step of: receiving an export request of a video section from a requestor device; providing the export request to an export application; receiving a completion notification for each overlaid still image of a plurality of overlaid still images, the each overlaid still image of the plurality of overlaid still images generated based on a video frame in the video section and one or more overlays; in response to receiving the completion notification, downloading the each overlaid still image of the plurality of overlaid still images; and generating an exported video using the plurality of overlaid still images.

At least some aspects of the present disclosure are directed to a computing device, comprising: one or more memories having instructions stored thereon; and one or more processors configured to execute the instructions and perform the operations comprising: receiving an export request of a video section from a requestor device; providing the export request to an export application; receiving a completion notification for each overlaid still image of a plurality of overlaid still images, the each overlaid still image of the plurality of overlaid still images generated based on a video frame in the video section and one or more overlays; in response to receiving the completion notification, downloading the each overlaid still image of the plurality of overlaid still images; and generating an exported video using the plurality of overlaid still images.

BRIEF DESCRIPTION OF THE DRAWINGS

The accompanying drawings are incorporated in and constitute a part of this specification and, together with the description, explain the features and principles of the disclosed embodiments. In the drawings.

FIGS. 2-5 are simplified diagrams showing example methods for exporting videos according to certain embodiments of the present disclosure;

DETAILED DESCRIPTION

Figure 1:
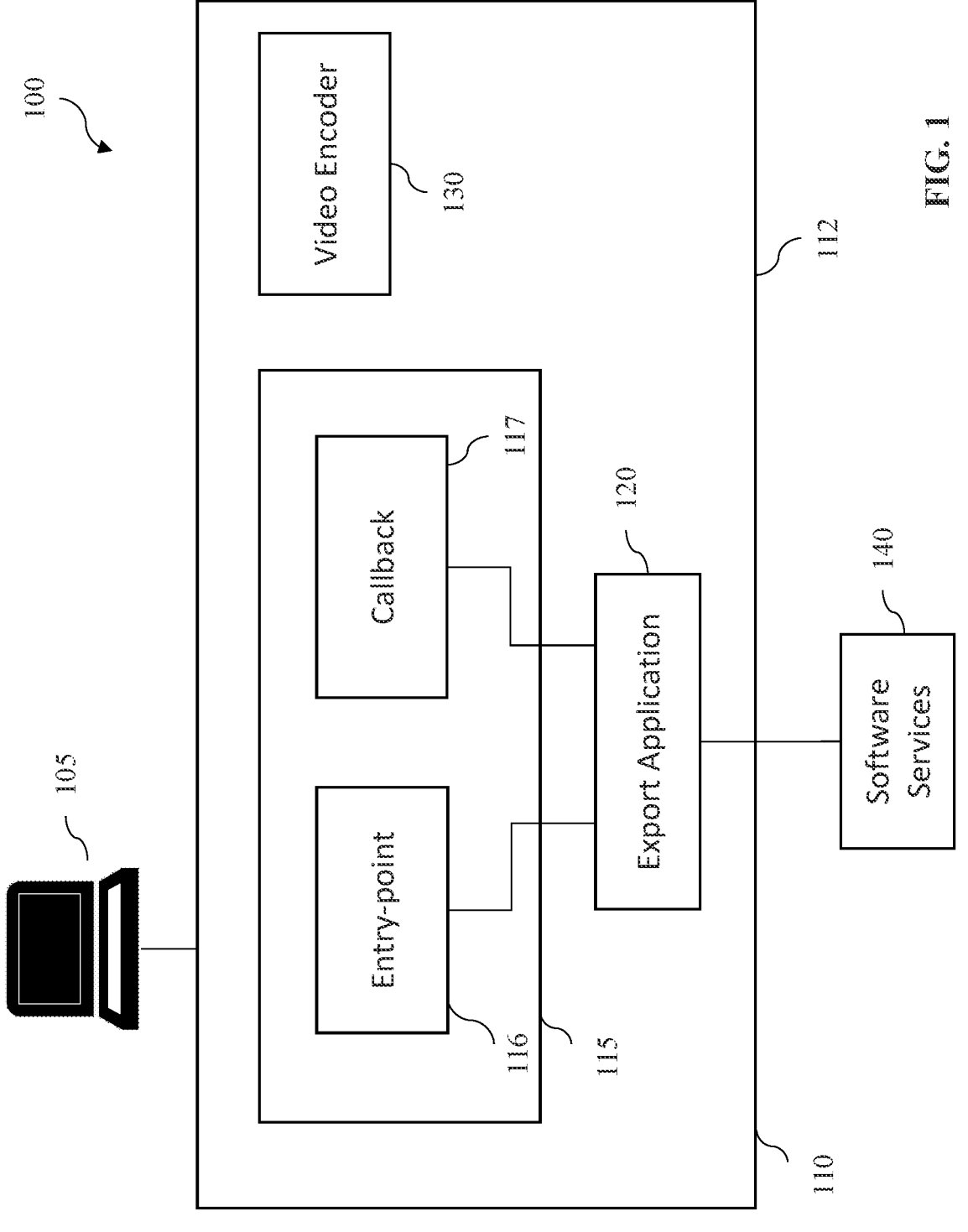
FIG. 1 depicts an illustrative system diagram of a video export system, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

Some video players are configured to parse metadata out of received live stream videos and use that parsed metadata to draw one or more overlays onscreen. As used herein, an overlay, or referred to as a visual overlay, refers to a graphical representation of certain information to be disposed on an image or a video. The one or more overlays include two types of overlays—object overlays and geography overlays. As used herein, an object overlay, or referred to an artificial intelligence (AI) overlay, refers to an overlay including graphical representation of certain information related to one or more objects detected by a system (e.g., an upstream system). As used herein, a geography overlay, also referred to as an augmented reality (AR) overlay, refers to an overlay including graphical representation of certain information related to map data from one or more data sources. In some embodiments, the map data represented by a geography overlay includes data obtained from one or more sources and determined map objects based at least a part upon a video's geographical metadata.

There are needs to export the videos with overlays intact. At least some embodiments of systems and methods are directed to export videos with one or more overlays intact on the exported videos. In certain embodiments, the exported videos are in standard formats (e.g., MPEG, MP4, MOV, DVI, etc.). In some embodiments, a video export system includes a server (e.g., a computing device, a cloud server, a physical server, a virtual server) with server software running on the server, the server software includes a set of features to manipulate a headless browser. As used herein, a headless browser is a web browser without a graphical user interface. In one example, the server software prompts the headless browser to navigate to an export application access point (e.g., a Uniformed Resource Locator (URL)). In some embodiments, the export application plays the requested section of video frame by frame and draws the one or more visual overlays onto each video frame inside the headless browser to generate corresponding overlaid still images. In certain embodiments, the server software is notified of the generation of each overlaid still image and configured to download each overlaid still image (e.g., to a server storage) by controlling the headless browser. In some embodiments, once the set of overlaid still images corresponding to all frames in a video or a video section have been downloaded, the server software assembles the set of overlaid still images into the exported video, for example, in a standard video format, a standard 30 frame-per-second (fps) video, and returns the exported video to the requestor (e.g., the exported video to be downloaded by a requestor device).

At least some embodiments of the present disclosure are directed to systems and methods for exporting videos with object overlays and geography overlays. In certain embodiments, the video export system is configured to export videos with other overlays intact on videos (e.g., raw videos).

FIG. 1 depicts an illustrative system diagram of a video export system 100, in accordance with certain embodiments of the present disclosure. FIG. 1 is merely an example. One of ordinary skill in the art would recognize many variations, alternatives, and modifications. According to certain embodiments, the video export system 100 includes a requestor device 105, a server 110, and one or more software services 140. According to some embodiments, the server 110 is configured to host at least one of a video clip distributor (e.g., a server software) 112, a web browser or headless browser 115, an export application (e.g., a frontend application) 120, and a video encoder and/or decoder 130. Although the above has been shown using a selected group of components for the video export system 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

According to some embodiments, the video export system 100 or one or more components of the video export system 100 can be integrated into a platform or a workflow. In certain embodiments, the requestor device 105 is a computing device associated with a requestor. In some examples, the requestor device 105 is configured to transmit a request of export a video section to the server 110 and/or the video clip distributor 112. In certain embodiments, the request includes an identifier of a video, one or more parameters (e.g., start time, starting offset, stop time, duration) of a video section (e.g., a video clip), a format (e.g., JPEG) of a still image (e.g., a video frame, a video snapshot), a format of an exported video, and/or the like. In some embodiments, the request includes information (e.g., URLs, service entry points, application programming interfaces (APIs), etc.) related to software and/or software services to gather information on overlays (e.g., geography overlays, object overlays). In certain embodiments, the request includes information on how the overlays to be added to the exported video section. In some examples, the request is provided via a requesting service (e.g., a software application). In one example, the request is to export a video (e.g., a video capturing an incoming aircraft) as originally illustrated on a map (e.g., a Gaia map).

According to certain embodiments, the video clip distributor 112 is configured to receive the request, directly or indirectly, from the requestor device 105. In some embodiments, the video clip distributor 112 includes at least one of the headless browser 115, the export application 120, and the video encoder 130. In certain embodiments, the video clip distributor 112 includes the headless browser 115, the export application 120, and the video encoder 130. In some embodiments, the video clip distributor 112 and/or the server 110 are configured to access the web browser 115. In certain embodiments, the web browser 115 takes the request and passes the request into a specially designed entry point 116 (e.g., an entry point function) in the export application 120. In some examples, the request includes a starting offset and duration for the requested video section (e.g., clip) along with all the service URLs required by the export application 120 to call services (e.g., a map service, an object service), as well as options related to the way the overlays to be rendered on the exported video section (e.g., a relative location on screen). In some embodiments, the parameters extracted from the request are corresponding to a video editing tool.

According to some embodiments, the web browser 115 navigates to the export application 120 and provides the parameters to the export application 120. In certain embodiments, the export application 120 runs inside the web browser 115. In some embodiments, the request is passed from the video clip distributor 112. In certain examples, the request is originally from the requestor device 105 or imported into the video clip distributor 112.

According to certain embodiments, the export application 120 is configured to access a video section based upon the request and the extracted parameters from the request. In some embodiments, the export application 120 is configured to generate a plurality of still images based on a plurality of video frames in the requested video section. In certain embodiments, the export application 120 is configured to play the plurality of still images using the web browser 115, for example, the headless browser. In some embodiments, when a still image of the plurality of still images is played on the web browser 115, the export application 120 is configured to draw one or more overlays on the still image and generate an overlaid still image. In certain embodiments, the export application 120 is configured to draw one or more overlays on the still image and generate an overlaid still image according to the request and/or extracted parameters from the request. In some examples, the request or an extracted parameter from the request includes a specified image format, for example, JPEG ("Joint Photographic Experts Group"), TIFF ("Tagged Image File Format"), PNG ("Portable Network Graphics"). In such examples, the export application 120 is configured to generate the still image and the overlaid still image in the specified image format. In some embodiments, the export application 120 is configured to generate a set of overlaid still images based on a set of still images corresponding to a set of video frames in the video section. In certain embodiments, the export application 120 is configured to generate the set of overlaid still images sequentially.

According to some embodiments, the video clip distributor 112 and/or the export application 120 is configured to interface with one or more software services 140. In certain embodiments, the video clip distributor 112 and/or the export application 120 is configured to interface with one or more software services 140 to extract one or more overlays. In some embodiments, the one or more overlays includes at least one selected from a group consisting of an object overlay, a geography overlay, and an entity overlay. In some embodiments, the one or more overlays include an object overlay, also referred to as an AI (artificial intelligence) overlay, which identifies one or more objects. In some examples, the object overlay is obtained from the software services 140 (e.g., an upstream software service) that is configured to identify the one or more objects.

In certain embodiments, the one or more overlays include a geography overlay, also referred to as an augmented reality (AR) overlay, which can be, for example, map data received and/or obtained from the software services 140. In some examples, the geography overlay includes geography information, such as latitude, longitude, altitude, area, location, address, landmark, and/or the like. In some embodiments, the one or more overlays include an entity overlay including information associated with an entity (e.g., an entity providing the data).

According to certain embodiments, the export application 120 is configured to obtain one or more overlays from the one or more software services 140 synchronously with the still image played inside the web browser 115. In some examples, the export application 120 is configured to obtain the one or more overlays from the one or more software services 140 based on information associated with the still image played inside the web browser 115. In one example, the export application 120 provides the still image or information associated with the still image (e.g., a timing offset in the video) to a software service 140 including object recognition function and receives an object overlay from the software service 140. In one example, the export application 120 provides the still image or information associated with the still image (e.g., a timing offset in the video) to a software service 140 including map data and receives a geography overlay from the software service 140. In some examples, the one or more overlays include synchronization information that identifies a timing in the video and/or the video section.

According to certain embodiments, the web browser 115 is configured to receive a request or a notification from the export application 120. In some embodiments, the web browser 115 includes a callback 117 that communicates with the export application 120. In certain examples, the callback 117 is implemented using java code or java script. In some examples, the callback 117 is a request or a notification received from the export application 120. In certain examples, the export application 120 is configured to provide a completion indication of one or more overlaid still images (e.g., a JPEG snapshot). In some embodiments, after receiving the completion notification, the video clip distributor 112 is configured to download the one or more overlaid still images. In certain embodiments, the generation and downloads of the overlaid still image(s) are repeated for all frames in the requested video section. For example, for a 30 second video with 30 frame-per-second (fps), the video clip distributor 112 collects 900 overlaid still images (e.g., JPEGs), for example, in a temporary directory on the server 110. In some examples, a subset of a set of overlaid still images corresponding to the set of frames in the video section have corresponding one or more overlays. In certain examples, a subset of the set of overlaid still images corresponding to the set of frames in the video section do not include any overlay.

According to certain embodiments, the video encoder 130 is configured to decode and encode videos. In some embodiments, the video encoder 130 is configured to generate the exported video section using the set of overlaid still images. In certain embodiments, the video encoder 130 is configured to generate the exported video section with a standard video format using the set of overlaid still images. In the example of 30 second video, the video encode takes the 900 still images and generate a 30 second MP4 video file.

In some embodiments, the video export system 100 includes one or more data repositories, for example, to store videos, still images, overlaid still images, exported video sections, video formats, requests, and/or the like. The data repositories may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the video export system 100 can execute software or firmware stored in non-transitory computer-readable medium to implement various processing steps. Various components and processors of the system 100 can be implemented by one or more computing devices, including but not limited to, circuits, a computer, a cloud-based processing unit, a processor, a processing unit, a microprocessor, a mobile computing device, and/or a tablet computer. In some cases, various components of the system 100 (e.g., the requestor device 105, the server 110, the video clip distributor 112, the web browser 115, the export application 120, the video encoder, the software services 140) can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the video export system 100 can be implemented in software or firmware executed by a computing device.

Various components of the video export system 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

FIG. 2 is a simplified diagram showing a method 200 for exporting videos according to certain embodiments of the present disclosure. This diagram is merely an example. One of ordinary skill in the art would recognize many variations, alternatives, and modifications. The method 200 for exporting videos includes processes 210, 215, 220, 225, 230, 235, 240, 245, 250, 255, 260. Although the above has been shown using a selected group of processes for the method 200 for exporting videos, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

According to some embodiments, at the process 210, a video export system (e.g., the video export system 100 in FIG. 1) and/or an export application (e.g., the export application 120 in FIG. 1) is configured to receive, a request on a section of a video (e.g., a video section) from a requestor (e.g., a requestor device, a user device). In certain embodiments, the video export system is configured to, for example, via an export application access point (e.g., an address, a Uniform Resource Locators (URL)), to activate the video export application. In some examples, the export application is a piece of software or a software module running on one or more processors. In certain examples, the export application can be requested to run via an URL. In certain examples, the request includes an identification of the video, a start time in the video, a stop time in the video, and/or a duration of the video section. In some embodiments, at the process 215, the video export system and/or the video export application is configured to access, for example, the video section based upon the request. In certain examples, the export application can decode the video section, for example, via a video decoder (e.g., the video decoder 130 in FIG. 1).

According to certain embodiments, at the process 225, the export application generates a still image based on a frame of the requested section of the video. In some examples, a frame, or referred to as a video frame, of the requested video section is at the start time of the video section. In certain examples, a frame of the requested video section is at a selected time from the start time of the video section. In some examples, a video frame includes information of changes from a previous frame. In certain examples, a video frame does not include the complete data of a still image at a certain time of a video section. In some examples, a video frame includes the complete data of a still image at a certain time of a video section. In some embodiments, the export application is configured to generate the still image based on the frame. In certain examples, the export application is configured to generate the still image based on the frame and a previous frame. In some examples, the export application is configured to generate the still image using the frame and a series of previous frames. In certain examples, the export application is configured to generate the still image using a base image and a series of changes. In some embodiments, the request includes an image format, and the export application is configured to generate a plurality of still images in the format requested. In some examples, the process 225 is computationally intensive and/or takes some time.

Figure 8:
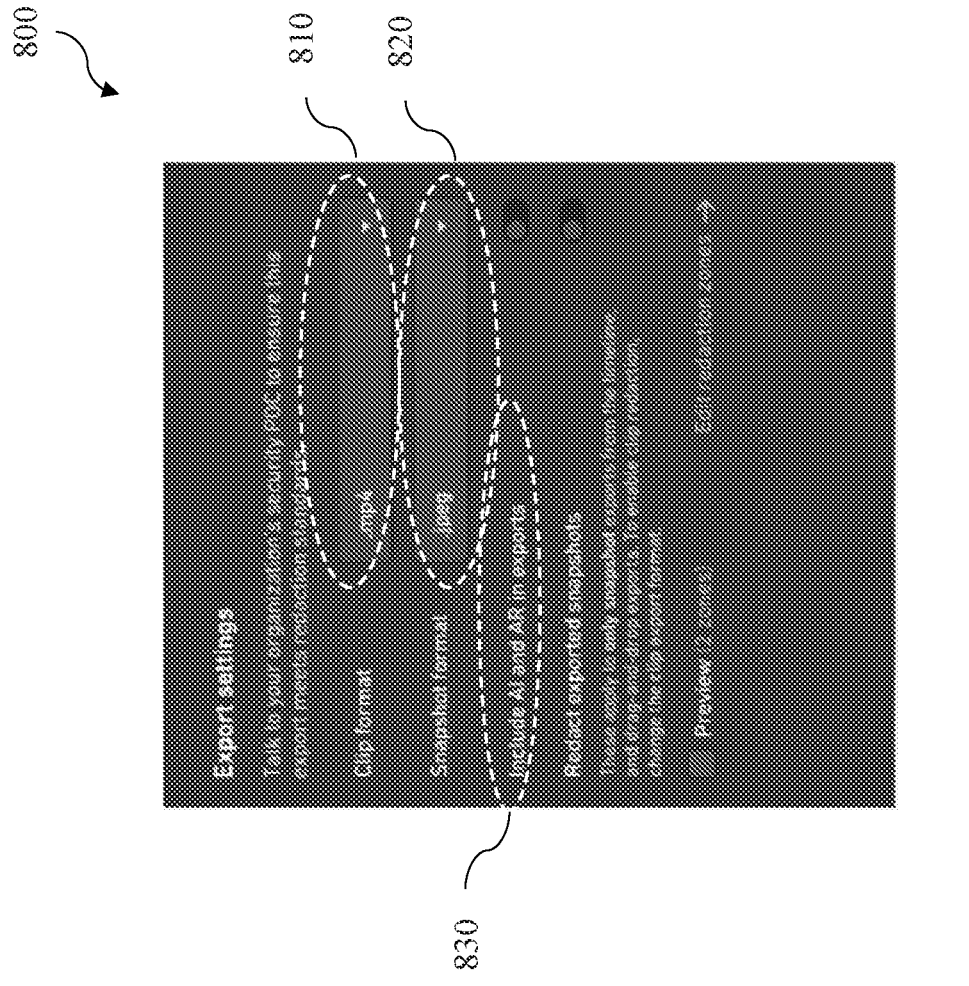
FIG. 8 shows an example of an export configuration illustrated in a reproduction of a graphical user interface according to certain embodiments of the present disclosure.

FIG. 8 shows an example of an export configuration 800 illustrated in a reproduction of a graphical user interface according to certain embodiments of the present disclosure. In this example, the export configuration 800 includes an image format configuration 810, a video format configuration 820, and overlay configuration 830. In certain examples, the export configurations (e.g., export configuration 800) are incorporated into the request for video export.

Referring back to FIG. 2, according to some embodiments, at the process 230, the export application plays the generated still image, for example, inside a headless browser. In certain examples, the export application loads data associated with the still image on the headless browser. In some examples, the export application is configured to play the plurality of still images corresponding to the plurality of video frames in the video section in the headless browser with a frame control. In some embodiments, at the process 235, the export application draws one or more overlays, also referred to as visual overlays, onto the still image inside the headless browser. In certain embodiments, the export application is configured to obtain one or more overlays related to the still image (e.g., related to an object captured in the still image, related to a location depicted in the still image).

Figure 6:
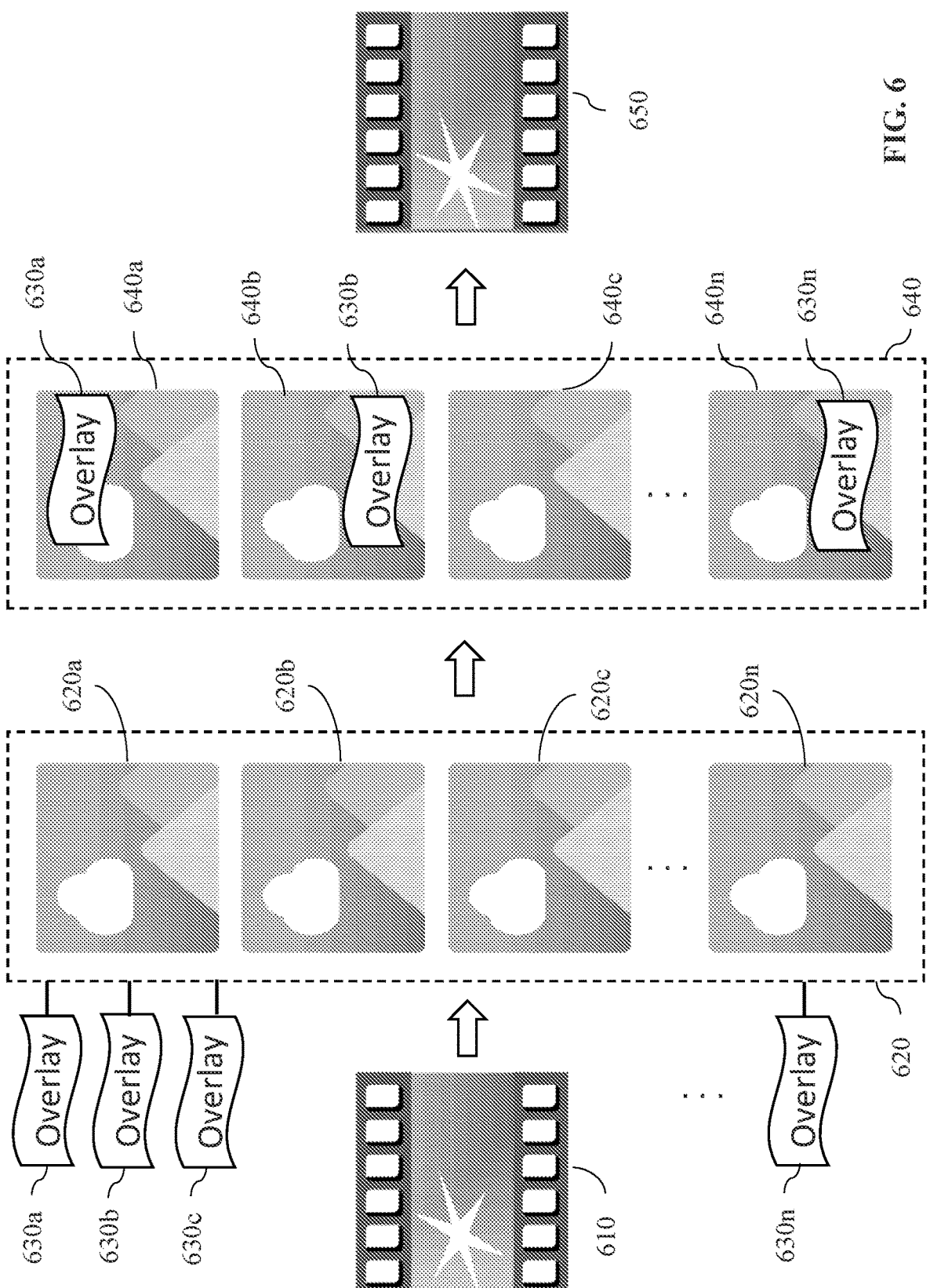
FIG. 6 shows an illustrative example of exporting a video with overlays according to certain embodiments of the present disclosure.

FIG. 6 shows an illustrative example of exporting a video 650 with overlays according to certain embodiments of the present disclosure. The video or the video section 610 is requested. In some embodiments, a set of still images 620 (620a, 620b, 620c, . . . 620n) are generated from the video section 610. In certain embodiments, the set of still images 620 are played sequentially on a canvas, for example, a container application, a headless browser. In certain embodiments, the one or more overlays 630*a*, 630*b*, 630*c*, . . . 630*n* can be accessed corresponding to one or more still images in the set of still images 620 being played on the canvas.

In some embodiments, the one or more overlays 630*a*, 630*b*, 630*c*, . . . 630*n* can be drawn onto the corresponding still images to generate a set of overlaid still images 640 (640*a*, 640*b*, 640*c*, . . . 640*n*). In some examples, an overlay (e.g., 630*a*) is drawn to a corresponding still image (e.g., 640*a*) at a specific location. In one example, the request includes the specific location for the overlay. In some embodiments, the request includes a set of image locations corresponding to one or more types of overlays. For example, the request includes a first image location (e.g., left upper corner) for a first type of overlay (e.g., object overlay) and a second image location (In certain examples, at least one of the overlaid still images (e.g., 640*a*, 640*b*) includes one or more overlays embedded in the corresponding still images. In some examples, at least one of the overlaid still images (e.g., 640*c*) does not includes any overlays embedded in the corresponding still images. In certain embodiments, the set of overlaid still images 640 are assembled and encoded into the exported video 650. In some examples, the exported video 650 has a same duration as the video 610. In certain examples, the exported video 650 has a same number of video frames as the video 610.

In some embodiments, a visual overlay includes synchronization information (e.g., an identifier, timing information) that identifies a video frame in the video and/or the video section. In some examples, the export application is configured to draw the visual overlay at a specific location on the still image. In certain examples, the specific location is included in the visual overlay. In some examples, the specific location is set by configuration information, for example, retrieved from a user input, a configuration file, and/or via a software interface. In some embodiments, the visual overlay includes graphical data and/or text data. In certain examples, the visual overlay includes only graphical data. In some examples, the visual overlay includes human readable text data.

Figure 7:
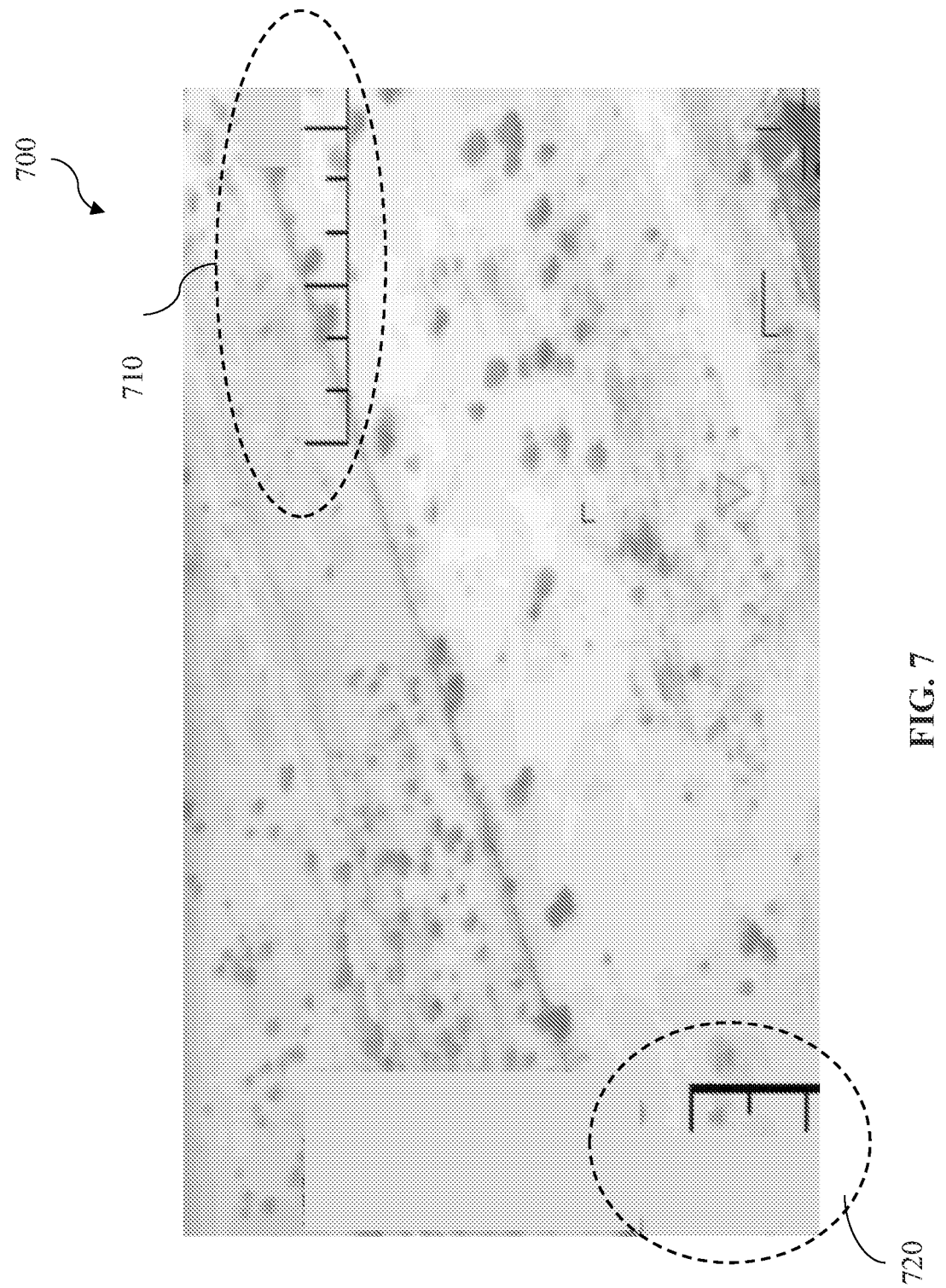
FIG. 7 shows some examples of visual overlays illustrated in a reproduction of a graphical user interface according to certain embodiments of the present disclosure.

FIG. 7 shows some examples of visual overlays (e.g., a first visual overlay 710 and a second visual overlay 720) illustrated in a reproduction of a graphical user interface 700 according to certain embodiments of the present disclosure. In some embodiments, the first visual overlay 710 is a reference scale on an image (e.g., to provide dimensions with respect to the image). In some embodiments, the second visual overlay 720 is also a reference scale on an image (e.g., to provide dimensions with respect to the image). In some embodiments, the first visual overlay 710 and the second visual overlay 720 provide the same reference dimensions. In some embodiments, the first visual overlay 710 and the second visual overlay 720 provide different reference dimensions. Other examples of visual overlays may be recognized by those of ordinary skill in the art at least in light of teachings described herein.

In certain embodiments, the one or more overlays includes at least one selected from a group consisting of an object overlay, a geography overlay, a location overlay, and an entity overlay. In some embodiments, the one or more overlays include an object overlay, also referred to as an AI overlay, which identifies one or more objects. In some examples, the object overlay is provided by one or more systems (e.g., the video export system, one or more systems different from the video export system, an upstream system) that is configured to identify the one or more objects. In certain examples, the object overlay includes synchronization information that identifies a timing in the video and/or the video section. In some examples, the export application is configured to draw the object overlay at a specific location on the still image. In certain examples, the specific location is included in the object overlay. In some examples, the specific location is set by configuration information, for example, retrieved from a user input, a configuration file, and/or via a software interface. In certain embodiments, the object overlay includes graphical data. In some embodiments, the object overlay includes human readable text data, for example, including a name of an identified object.

According to certain embodiments, the one or more overlays include a geography overlay, also referred to as an augmented reality (AR) overlay, which can be, for example, map data received and/or obtained from one or more data sources. In some examples, the geography overlay includes geography information, such as latitude, longitude, altitude, and/or the like. In certain examples, the object overlay includes synchronization information that identifies a timing in the video and/or the video section. In some examples, the export application is configured to draw the geography overlay at a specific location on the still image. In certain examples, the specific location is included in the object overlay. In some examples, the specific location is set by configuration information, for example, retrieved from a user input, a configuration file, and/or via a software interface. In certain embodiments, the geography overlay includes graphical data. In some embodiments, the geography overlay includes human readable text data, for example, including a name of a location.

Referring back to FIG. 2, according to some embodiments, at the process 240, the export application is configured to transmit a completion notification after the overlaid still image has been generated. In certain examples, the server is notified by the export application indirectly. In some examples, a listener application (e.g., a listener application implemented by java script, a listener application implemented by java code) is running on a server to receive the notification indicating that the overlaid still image is ready. In certain examples, the export application is configured to write to a post communication to inform the video export system. In certain embodiments, at the process 245, the overlaid still image is exported, for example, by controlling the canvas hosting the overlaid still image.

According to certain embodiments, at the process 250, the video export system is configured to determine whether all frames in the request section of the video have been processed. In some embodiments, at the process 255, the export application is configured to navigate to a subsequent frame (e.g., the frame corresponding to the still image 620*b* in FIG. 6) of the video section and goes back to the process 255. In certain embodiments, the method 200 repeats process 225-255 until all frames in the video section have been processed. In some examples, the subsequent frame has a predetermined time interval from the processed frame. In certain examples, the predetermined time interval is configurable, for example, by a user, a configuration repository, a configuration file, via a software interface. In some examples, the export application is configured to draw one or more respective overlays to each still image in the set of still images generated from the frames of the requested video section. In certain examples, the export application is configured to draw one or more respective overlays to a subset of still images in the set of still images generated from the frames of the requested video section. In some examples, a set of overlaid still images are generated. In certain examples, the set of overlaid still images are downloaded.

According to some embodiments, after all frames in the video section are processed, the method 200 moves to the process 260, and an exported video is generated from the overlaid still images. In certain embodiments, the video export system is configured to assemble and encode the downloaded overlaid still images into the exported video, for example, using a video encoder (e.g., the video encoder 130 in FIG. 1). According to certain embodiments, the exported video includes the data of the overlays being drawn on the set of overlaid still images and is configured to present the overlaid information when the output video is played. In some examples, the set of overlaid still images are generated sequentially.

Figure 3:
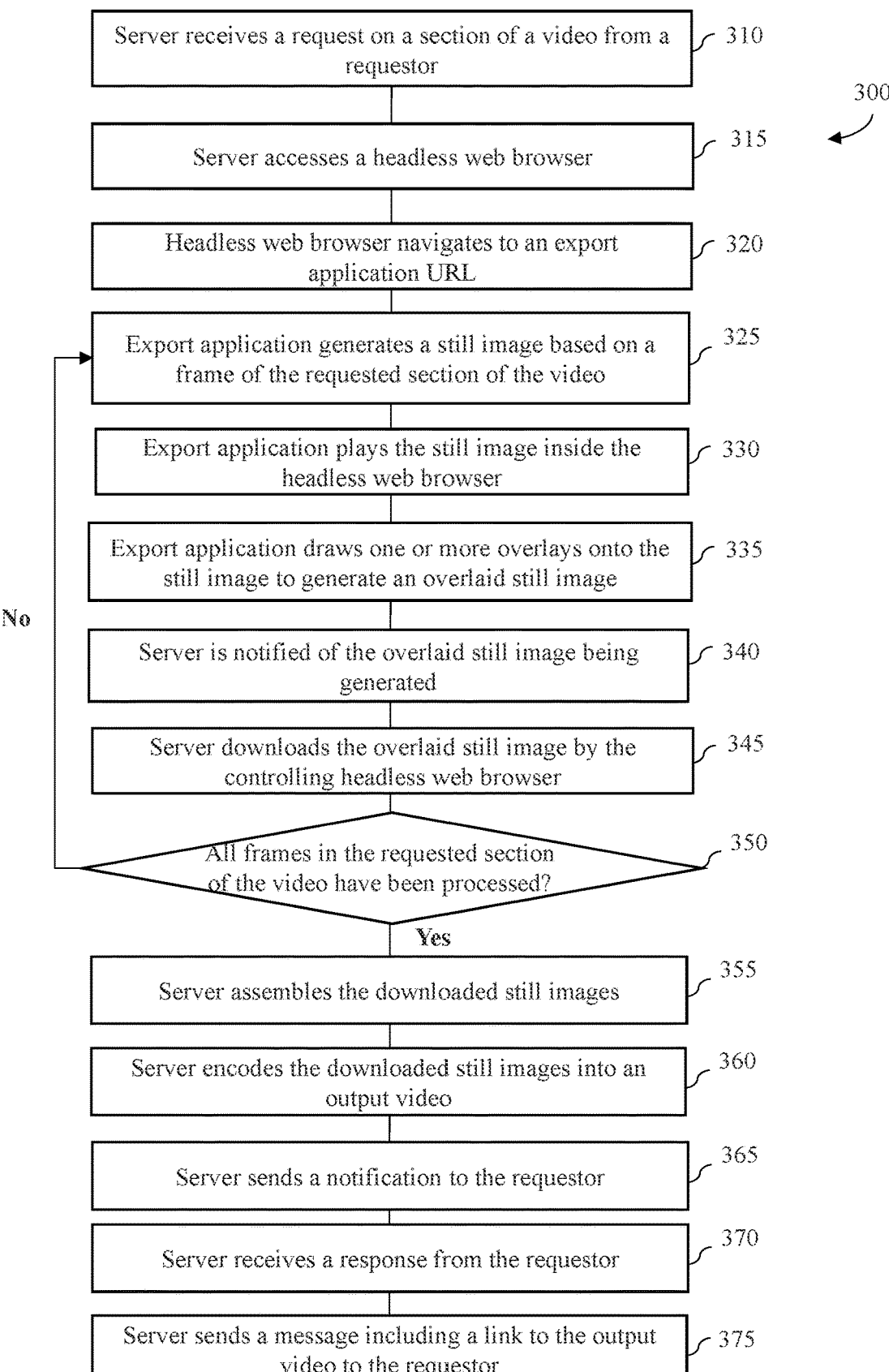

FIG. 3 is a simplified diagram showing a method 300 for exporting videos according to certain embodiments of the present disclosure. This diagram is merely an example. One of ordinary skill in the art would recognize many variations, alternatives, and modifications. The method 300 for exporting videos includes processes 310, 315, 320, 325, 330, 335, 340, 345, 350, 355, 360, 365, 370, and 375. Although the above has been shown using a selected group of processes for the method 300 for exporting videos, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

According to some embodiments, at the process 310, the video export system (e.g., the video export system 100 in FIG. 1) is configured to receive, for example, by a server (e.g., a computing device, a cloud server, a virtual server), a request on a section of a video (e.g., a video section) from a requestor (e.g., a requestor device, a user device). In certain examples, the request includes an identification of the video, a start time in the video, a stop time in the video, and/or a duration of the video section. In some embodiments, at the process 315, the video export system is configured to access, for example, by the server, a headless browser. In certain embodiments, at the process 320, the video export system is configured to, for example, via an export application access point (e.g., an address, a Uniform Resource Locators (URL)), to activate the export application. In some examples, the export application is a piece of software or a software module running on one or more processors. In certain examples, the export application can be requested to run via an URL. In some examples, the export application can access the video section based upon the received request. In certain examples, the export application can decode the video section, for example, via a video decoder (e.g., the video decoder 130 in FIG. 1).

According to certain embodiments, at the process 325, the export application generates a still image based on a frame of the requested section of the video. In some examples, a frame, or referred to as a video frame, of the requested video section is at the start time of the video section. In certain examples, a frame of the requested video section is at a selected time from the start time of the video section. In some examples, a video frame includes information of changes from a previous frame. In certain examples, a video frame does not include the complete data of a still image at a certain time of a video section. In some examples, a video frame includes the complete data of a still image at a certain time of a video section. In some embodiments, the export application is configured to generate the still image based on the frame. In certain examples, the export application is configured to generate the still image based on the frame and a previous frame. In some examples, the export application is configured to generate the still image using the frame and a series of previous frames. In certain examples, the export application is configured to generate the still image using a base image and a series of changes. In some embodiments, the request includes a format of the plurality of still images, and the export application is configured to generate a plurality of still images in the format requested. In some examples, the process 325 is computationally intensive and/or take some time.

According to some embodiments, at the process 330, the export application plays the still image inside the headless browser. In certain examples, the export application loads data associated with the still image on the headless browser. In some examples, the export application is configured to play the plurality of still images corresponding to the plurality of video frames in the video section in the headless browser with a frame control. In some embodiments, at the process 335, the export application draws one or more overlays, also referred to as visual overlays, onto the still image inside the headless browser. In some embodiments, an visual overlay includes synchronization information (e.g., an identifier, timing information) that identifies a video frame in the video and/or the video section. In some examples, the export application is configured to draw the visual overlay at a specific location on the still image. In certain examples, the specific location is included in the visual overlay. In some examples, the specific location is set by configuration information, for example, retrieved from a user input, a configuration file, and/or via a software interface. In some embodiments, the visual overlay includes graphical data and/or text data. In certain examples, the visual overlay includes only graphical data. In some examples, the visual overlay includes human readable text data. FIG. 7 shows some examples of visual overlays (e.g., 710, 720).

In certain embodiments, the one or more overlays includes at least one selected from a group consisting of an object overlay, a geography overlay, a location overlay, and an entity overlay. In some embodiments, the one or more overlays include an object overlay, also referred to as an AI overlay, which identifies one or more objects. In some examples, the object overlay is provided by one or more systems (e.g., the video export system, one or more systems different from the video export system, an upstream system) that is configured to identify the one or more objects. In certain examples, the object overlay includes synchronization information that identifies a timing in the video and/or the video section. In some examples, the export application is configured to draw the object overlay at a specific location on the still image. In certain examples, the specific location is included in the object overlay. In some examples, the specific location is set by configuration information, for example, retrieved from a user input, a configuration file, and/or via a software interface. In certain embodiments, the object overlay includes graphical data. In some embodiments, the object overlay includes human readable text data, for example, including a name of an identified object.

According to certain embodiments, the one or more overlays include a geography overlay, also referred to as an augmented reality (AR) overlay, which can be, for example, map data received and/or obtained from one or more data sources. In some examples, the geography overlay includes geography information, such as latitude, longitude, altitude, and/or the like. In certain examples, the object overlay includes synchronization information that identifies a timing in the video and/or the video section. In some examples, the export application is configured to draw the geography overlay at a specific location on the still image. In certain examples, the specific location is included in the object overlay. In some examples, the specific location is set by configuration information, for example, retrieved from a user input, a configuration file, and/or via a software interface. In certain embodiments, the geography overlay includes graphical data. In some embodiments, the geography overlay includes human readable text data, for example, including a name of a location.

According to some embodiments, at the process 340, the server is notified, for example, by the export application or a component of the video export system, of the still image with the one or more overlays, or referred to as the overlaid still image, has been generated. In certain examples, the server is notified by the export application indirectly. In some examples, a listener application (e.g., a listener application implemented by java script, a listener application implemented by java code) is running on the server to receive the notification indicating that the overlaid still image is ready. In some examples, the export application is configured to send out a completion notification. In certain examples, the export application is configured to write to a certain communication channel to inform the server. In certain embodiments, at the process 345, in response to the notification, the server is configured to download the overlaid still image by controlling the headless browser. In some embodiments, the video export system and/or the server is configured to verify the overlaid still image being downloaded successfully.

According to certain embodiments, at the process 350, the video export system (e.g., the server, the video clip distributor) is configured to determine whether all frames in the request section of the video have been processed. In some embodiments, the method 300 repeats process 325-350 until all frames in the video section have been processed. In certain embodiments, if not all frames being processed, the method 300 goes back to the process 325 to generate a subsequent still image based on a subsequent frame of the requested video section. In some examples, the subsequent frame has a predetermined time interval from the processed frame. In certain examples, the predetermined time interval is configurable, for example, by a user, a configuration repository, a configuration file, via a software interface. In some embodiments, after all frames in the video section are processed, the method 300 moves to the process 355. In some examples, the export application is configured to draw one or more respective overlays to each still image in the set of still images generated from the frames of the requested video section. In certain examples, the export application is configured to draw one or more respective overlays to a subset of still images in the set of still images generated from the frames of the requested video section. In some examples, a set of overlaid still images are generated. In certain examples, the set of overlaid still images are downloaded.

According to some embodiments, at the process 355, the server is configured to assemble the downloaded overlaid still images. In certain embodiments, at the process 360, the server is configured to encode the downloaded overlaid still images into an output video, for example, using a video encoder (e.g., the video encoder 130 in FIG. 1). In some embodiments, at the process 365, the server is configured to send a notification to the requestor (e.g., the requestor device 105 in FIG. 1) to inform the readiness of the output video. In certain embodiments, at the process 370, the server receives a response from the requestor. In some embodiments, at the process 375, the server sends a message including a link to the requestor, where the link allows the requestor to download the output video.

According to certain embodiments, the output video includes the data of the overlays being drawn on the set of overlaid still images and is configured to present the overlaid information when the output video is played. In some examples, the set of overlaid still images are generated sequentially.

FIG. 4 is a simplified diagram showing a method 400 for exporting videos according to certain embodiments of the present disclosure. This diagram is merely an example. One of ordinary skill in the art would recognize many variations, alternatives, and modifications. The method 400 for exporting videos includes processes 410, 415, 420, 425, 430, 435, 440, 445, 450, and 455. Although the above has been shown using a selected group of processes for the method 400 for exporting videos, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

According to some embodiments, at the process 410, the video export system (e.g., the video export system 100 in FIG. 1) or the video clip distributor (e.g., the video clip distributor 112 in FIG. 1) is configured to receive a request on a section of a video (e.g., a video section) from a requestor (e.g., a requestor device, a user device). In certain examples, the request includes an identification of the video, a start time in the video, a stop time in the video, and/or a duration of the video section. In some embodiments, at the process 415, the video export system or the video clip distributor is configured to access a headless browser to start an export application (e.g., the export application 120 in FIG. 1). In certain embodiments, the video export system is configured to, for example, via an export application access point (e.g., an address, a Uniform Resource Locators (URL)), to activate the export application. In some examples, the export application is a piece of software or a software module running on one or more processors. In certain examples, the export application can be requested to run via an URL. In some examples, the export application can access the video section based upon the received request. In certain examples, the export application can decode the video section, for example, via a video decoder (e.g., the video decoder 130 in FIG. 1).

According to certain embodiments, the export application generates a still image based on a frame of the requested section of the video. In some examples, a frame, or referred to as a video frame, of the requested video section is at the start time of the video section. In certain examples, a frame of the requested video section is at a selected time from the start time of the video section. In some examples, a video frame includes information of changes from a previous frame. In certain examples, a video frame does not include the complete data of a still image at a certain time of a video section. In some examples, a video frame includes the complete data of a still image at a certain time of a video section. In some embodiments, the export application is configured to generate the still image based on the frame. In certain examples, the export application is configured to generate the still image based on the frame and a previous frame. In some examples, the export application is configured to generate the still image using the frame and a series of previous frames. In certain examples, the export application is configured to generate the still image using a base image and a series of changes. In some embodiments, the request includes a format of the plurality of still images, and the export application is configured to generate a plurality of still images in the format requested.

According to some embodiments, the export application plays the still image inside the headless browser. In certain examples, the export application loads data associated with the still image on the headless browser. In some examples, the export application is configured to play the plurality of still images corresponding to the plurality of video frames in the video section in the headless browser with a frame control. In some embodiments, the export application draws one or more overlays, also referred to as visual overlays, onto the still image inside the headless browser. In some embodiments, a visual overlay includes synchronization information (e.g., an identifier, timing information) that identifies a video frame in the video and/or the video section. In some examples, the export application is configured to draw the visual overlay at a specific location on the still image. In certain examples, the specific location is included in the visual overlay. In some examples, the specific location is set by configuration information, for example, retrieved from a user input, a configuration file, and/or via a software interface. In some embodiments, the visual overlay includes graphical data and/or text data. In certain examples, the visual overlay includes only graphical data. In some examples, the visual overlay includes human readable text data.

According to some embodiments, at the process 420, the video export system or the video clip distributor receives a completion notification of an overlaid still image corresponding to a frame in the requested video section has been generated. In certain examples, the video clip distributor is notified by the export application directly or indirectly. In some examples, a listener application (e.g., a listener application implemented by java script, a listener application implemented by java code) is running on the server to receive the notification indicating that the overlaid still image is ready. In some examples, the export application is configured to send out a completion notification. In certain examples, the export application is configured to write to a post to inform the video clip distributor. In certain embodiments, at the process 425, in response to the notification, the video export system or the video clip distributor is configured to download the overlaid still image, for example, by controlling the headless browser. In some embodiments, the video export system and/or the video clip distributor is configured to verify the overlaid still image being downloaded successfully.

According to certain embodiments, at the process 430, the video export system (e.g., the server, the video clip distributor) is configured to determine whether all frames in the request section of the video have been processed. In some embodiments, the method 400 repeats process 420-430 until all frames in the video section have been processed and downloaded. In certain examples, if not all frames being processed, the method 400 goes back to the process 425 to generate a subsequent still image based on a subsequent frame of the requested video section. In some examples, the subsequent frame has a predetermined time interval from the processed frame. In certain examples, the predetermined time interval is configurable, for example, by a user, a configuration repository, a configuration file, via a software interface. In some embodiments, after all frames in the video section are processed, the method 400 moves to the process 435. In some examples, a set of overlaid still images are generated. In certain examples, the set of overlaid still images are downloaded.

According to some embodiments, at the process 435, the video export system or the video clip distributor assembles the set of overlaid still images. In certain embodiments, at the process 440, the video export system or the video clip distributor encodes the set of downloaded overlaid still images into an exported video, for example, using a video encoder (e.g., the video encoder 130 in FIG. 1). In some embodiments, at the process 445, the video export system or the video clip distributor is configured to send a notification to the requestor (e.g., the requestor device 105 in FIG. 1) to inform the readiness of the exported video. In certain embodiments, at the process 450, the video export system or the video clip distributor receives a response from the requestor. In some embodiments, at the process 455, the server sends a message including a link to the requestor, where the link allows the requestor to download the exported video.

According to certain embodiments, the exported video includes the data of the overlays being drawn on the set of overlaid still images and is configured to present the overlaid information when the output video is played. In some examples, the set of overlaid still images are generated sequentially.

FIG. 5 is a simplified diagram showing a method 500 for exporting videos according to certain embodiments of the present disclosure. This diagram is merely an example. One of ordinary skill in the art would recognize many variations, alternatives, and modifications. The method 500 for exporting videos includes processes 510, 515, 520, 525, 530, 535, and 540. Although the above has been shown using a selected group of processes for the method 500 for exporting videos, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

According to some embodiments, at the process 510, a headless browser (e.g., the web browser 115 in FIG. 1) is accessed with a request on a section of a video (e.g., a video section) from a requestor (e.g., a requestor device, a user device). In certain examples, the request includes an identification of the video, a start time in the video, a stop time in the video, and/or a duration of the video section. In some embodiments, at the process 515, the headless browser extracts one or more parameters from the request. In certain embodiments, the request parameters include an identifier of a video, one or more parameters (e.g., start time, starting offset, stop time, duration) of a video section (e.g., a video clip), an image format (e.g., JPEG), a video format of an exported video, and/or the like. In some embodiments, the request parameters include software information (e.g., URLs, service entry points, application programming interfaces (APIs), etc.) related to software and/or software services to gather information on overlays (e.g., geography overlays, object overlays). In certain embodiments, the request parameters include information on how the overlays to be added to the exported video section (e.g., overlay placement information, overlay duration information). In some examples, the request is provided via a requesting service (e.g., a software application). In one example, the request is to export a video (e.g., a video capturing an incoming aircraft) as originally illustrated on a map (e.g., a Gaia map).

In certain embodiments, at the process 520, the headless browser is directed to navigate to an export application (e.g., the export application 120 in FIG. 1) with the request parameters. In some examples, the export application is a piece of software or a software module running on one or more processors. In certain examples, the export application can be requested to run via an URL. In some examples, the export application can access the video section based upon the received request. In certain examples, the export application can decode the video section, for example, via a video decoder (e.g., the video decoder 130 in FIG. 1).

According to certain embodiments, at the process 525, the headless browser hosts a still image corresponding to a frame of the requested video section. In some examples, a frame, or referred to as a video frame, of the requested video section is at the start time of the video section. In certain examples, a frame of the requested video section is at a selected time from the start time of the video section. In some examples, a video frame includes information of changes from a previous frame. In certain examples, a video frame does not include the complete data of a still image at a certain time of a video section. In some examples, a video frame includes the complete data of a still image at a certain time of a video section. In some embodiments, the export application is configured to generate the still image based on the frame. In certain examples, the export application is configured to generate the still image based on the frame and a previous frame. In some examples, the export application is configured to generate the still image using the frame and a series of previous frames. In certain examples, the export application is configured to generate the still image using a base image and a series of changes. In some embodiments, the request includes a format of the plurality of still images, and the export application is configured to generate a plurality of still images in the format requested.

In certain examples, the export application loads data associated with the still image on the headless browser. In some examples, the export application is configured to play the plurality of still images corresponding to the plurality of video frames in the video section in the headless browser with a frame control. In some embodiments, at the process 530, the headless browser hosts the still image with one or more overlays being drawn, for example, by the export application.

In certain embodiments, the one or more overlays includes at least one selected from a group consisting of an object overlay, a geography overlay, a location overlay, and an entity overlay. In some embodiments, the one or more overlays include an object overlay, also referred to as an AI overlay, which identifies one or more objects. In some examples, the object overlay is provided by one or more systems (e.g., the video export system, one or more systems different from the video export system, an upstream system) that is configured to identify the one or more objects. In certain examples, the object overlay includes synchronization information that identifies a timing in the video and/or the video section. In some examples, the export application is configured to draw the object overlay at a specific location on the still image. In certain examples, the specific location is included in the object overlay. In some examples, the specific location is set by configuration information, for example, retrieved from a user input, a configuration file, and/or via a software interface. In certain embodiments, the object overlay includes graphical data. In some embodiments, the object overlay includes human readable text data, for example, including a name of an identified object.

According to certain embodiments, the one or more overlays include a geography overlay, also referred to as an augmented reality (AR) overlay, which can be, for example, map data received and/or obtained from one or more data sources. In some examples, the geography overlay includes geography information, such as latitude, longitude, altitude, and/or the like. In certain examples, the object overlay includes synchronization information that identifies a timing in the video and/or the video section. In some examples, the export application is configured to draw the geography overlay at a specific location on the still image. In certain examples, the specific location is included in the object overlay. In some examples, the specific location is set by configuration information, for example, retrieved from a user input, a configuration file, and/or via a software interface. In certain embodiments, the geography overlay includes graphical data. In some embodiments, the geography overlay includes human readable text data, for example, including a name of a location.

According to some embodiments, at the process 535, the headless browser initiates a download of the overlaid still image. In certain examples, the headless browser initiates the download of the overlaid still image at the control of the video export system or the video clip distributor. According to certain embodiments, at the process 540, the video export system is configured to determine whether all frames in the request section of the video have been processed. In some embodiments, the method 500 repeats process 525-540 until all frames in the video section have been processed. In certain embodiments, if not all frames being processed, the method 400 goes back to the process 425 to host a still image corresponding to a subsequent frame of the requested video section. In some examples, the subsequent frame has a predetermined time interval from the processed frame. In certain examples, the predetermined time interval is configurable, for example, by a user, a configuration repository, a configuration file, via a software interface.

According to some embodiments, the video export system is configured to assemble and encode the downloaded overlaid still images into an exported video. In certain embodiments, the video export system is configured to encode the downloaded overlaid still images into the exported video, for example, using a video encoder (e.g., the video encoder 130 in FIG. 1). According to certain embodiments, the exported video includes the data of the overlays being drawn on the set of overlaid still images and is configured to present the overlaid information when the output video is played. In some examples, the exported video is generated in a video format according to a request parameter.

Figure 9:
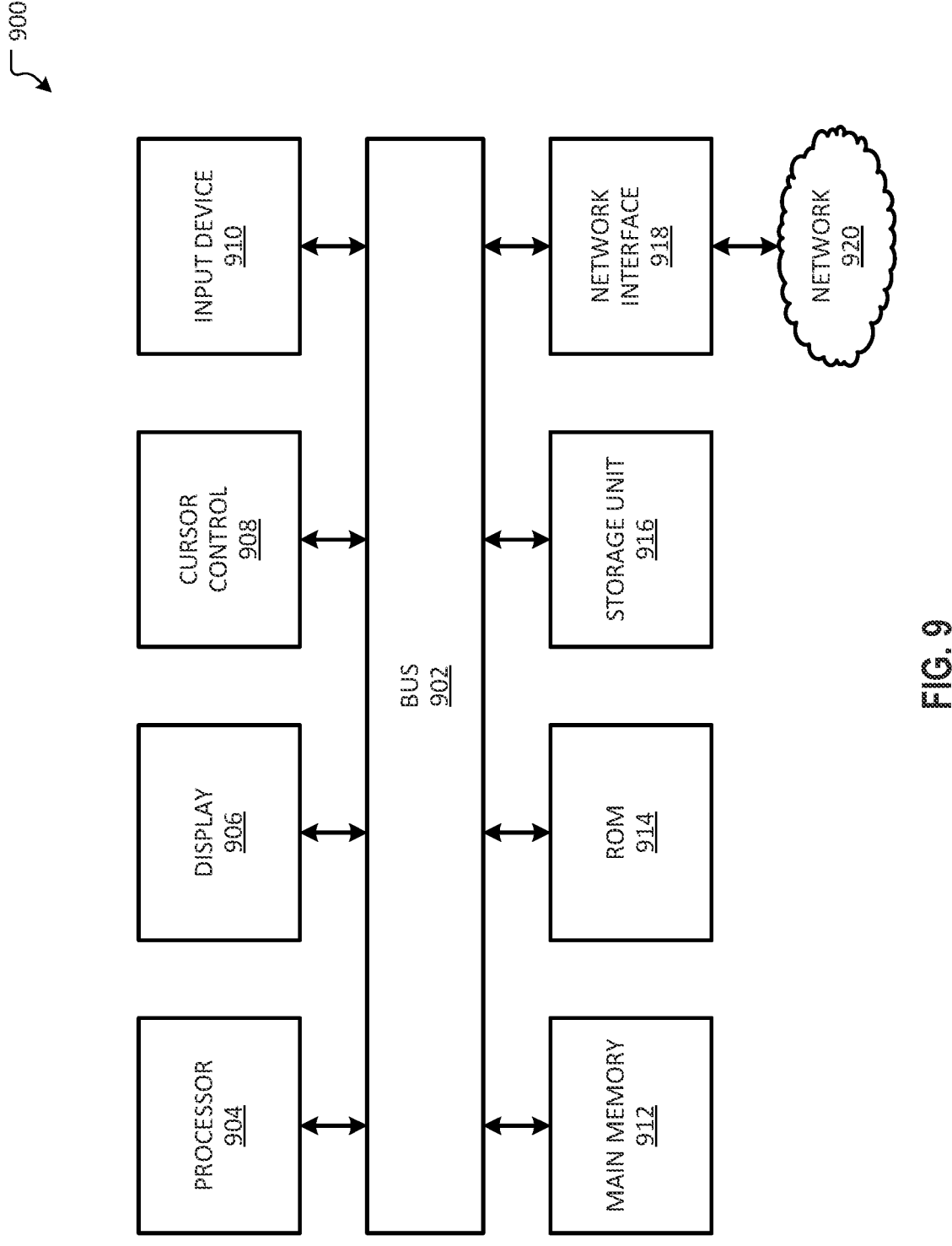
FIG. 9 shows a simplified diagram showing a computing system for exporting videos according to certain embodiments of the present disclosure.

FIG. 9 is a simplified diagram showing a computing system for exporting videos according to one embodiment of the present invention. This diagram is merely an example, which should not unduly limit the scope of the claims. One of ordinary skill in the art would recognize many variations, alternatives, and modifications. The computing system 900 includes a bus 902 or other communication mechanism for communicating information, a processor 904, a display 906, a cursor control component 908, an input device 910, a main memory 912, a read only memory (ROM) 914, a storage unit 916, and a network interface 918. In some embodiments, some or all processes (e.g., steps) of the method 200, 300, 400 and/or 500 are performed by the computing system 900. In some examples, the bus 902 is coupled to the processor 904, the display 906, the cursor control component 908, the input device 910, the main memory 912, the read only memory (ROM) 914, the storage unit 916, and/or the network interface 918. In certain examples, the network interface is coupled to a network 920. For example, the processor 904 includes one or more general purpose microprocessors. In some examples, the main memory 912 (e.g., random access memory (RAM), cache and/or other dynamic storage devices) is configured to store information and instructions to be executed by the processor 904. In certain examples, the main memory 912 is configured to store temporary variables or other intermediate information during execution of instructions to be executed by processor 904. For examples, the instructions, when stored in the storage unit 916 accessible to processor 904, render the computing system 900 into a special-purpose machine that is customized to perform the operations specified in the instructions. In some examples, the ROM 914 is configured to store static information and instructions for the processor 904. In certain examples, the storage unit 916 (e.g., a magnetic disk, optical disk, or flash drive) is configured to store information and instructions.

In some embodiments, the display 906 (e.g., a cathode ray tube (CRT), an LCD display, or a touch screen) is configured to display information to a user of the computing system 900. In some examples, the input device 910 (e.g., alphanumeric and other keys) is configured to communicate information and commands to the processor 904. For example, the cursor control 908 (e.g., a mouse, a trackball, or cursor direction keys) is configured to communicate additional information and commands (e.g., to control cursor movements on the display 906) to the processor 904.

According to certain embodiments, a method for generating an exported video is provided. The method includes: accessing a video section based upon a request; generating a plurality of still images based on a plurality of video frames in the video section; playing the plurality of still images inside a headless browser; and drawing one or more overlays on the plurality of still images played inside the headless browser to generate a set of overlaid still images; wherein the exported video is generated based upon the set of overlaid still images; wherein the method is performed using one or more processors. For example, the method is implemented according to at least FIG. 1, FIG. 2, FIG. 3, FIG. 4, and/or FIG. 5.

In some embodiments, the set of overlaid still images are generated sequentially. In some embodiments, the method further includes: transmitting a completion notification to a computing device after generating each overlaid still image of the set of overlaid still images. In some embodiments, the one or more overlays include at least one selected from a group consisting of an object overlay, a geography overlay, and an entity overlay.

In some embodiments, the drawing one or more overlays comprises drawing at least one overlay of the one or more overlays on one still image of the plurality of still images. In some embodiments, the at least one overlay includes at least one selected from a group consisting of an object overlay and a geography overlay.

In some embodiments, the request includes an image format, wherein the generating a plurality of still images comprises generating the plurality of still images in the image format. In some embodiments, the request includes a video format, wherein the exported video is generated in the video format based upon the set of overlaid still images. In some embodiments, the request includes a parameter associated with the frame control.

In some embodiments, the method further includes: playing the plurality of still images corresponding to the plurality of video frames in the video section inside the headless browser with a frame control. In some embodiments, the method further includes: obtaining at least one of the one or more overlays from a software service synchronously with one still image of the plurality of still images being played inside the headless browser.

According to some embodiments, a method for generating an exported video is provided. The method includes: receiving an export request of a video section from a requestor device; providing the export request to an export application; receiving a completion notification for each overlaid still image of a plurality of overlaid still images, the each overlaid still image of the plurality of overlaid still images generated based on a video frame in the video section and one or more overlays; in response to receiving the completion notification, downloading the each overlaid still image of the plurality of overlaid still images; and generating the exported video using the plurality of overlaid still images wherein the method is performed using one or more processors. For example, the method is implemented according to at least FIG. 1, FIG. 2, FIG. 3, FIG. 4, and/or FIG. 5.

In some embodiments, the method further includes: transmitting the exported video to the requestor device. In some embodiments, the transmitting the exported video to the requestor device includes transmitting a message including a link to the exported video to the requestor device. In some embodiments, the one or more overlays includes at least one selected from a group consisting of an object overlay, a geography overlay, and an entity overlay. In some embodiments, the providing the export request to an export application includes: accessing a headless browser; and navigating to an access point of the export application inside the headless browser.

According to some embodiments, a computing device is provided. The computing device includes: one or more memories having instructions stored thereon; and one or more processors configured to execute the instructions and perform the operations including: receiving an export request of a video section from a requestor device; providing the export request to an export application; receiving a completion notification for each overlaid still image of a plurality of overlaid still images, the each overlaid still image of the plurality of overlaid still images generated based on a video frame in the video section and one or more overlays; in response to receiving the completion notification, downloading the each overlaid still image of the plurality of overlaid still images; and generating an exported video using the plurality of overlaid still images. For example, the computing device is implemented according to at least FIG. 1, FIG. 2, FIG. 3, FIG. 4, and/or FIG. 5.

In some embodiments, the operations further include: transmitting the exported video to the requestor device. In some embodiments, the transmitting the exported video to the requestor device includes transmitting a message comprising a link to the exported video to the requestor device. In some embodiments, the one or more overlays includes at least one selected from a group consisting of an object overlay, a geography overlay, and an entity overlay. In some embodiments, the providing the export request to an export application includes: accessing a headless browser; and navigating to an access point of the export application inside the headless browser.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for generating a video for exporting, the method comprising:
   accessing a video section based upon a request;
   generating a plurality of still images based on a plurality of video frames in the video section;
   obtaining at least one of the one or more overlays from a software service synchronously with one still image of the plurality of still images being played inside a headless browser;
   when playing the plurality of still images inside the headless browser, drawing one or more overlays on the plurality of still images played inside the headless browser to generate a set of overlaid still images;
   wherein the video is generated based upon the set of overlaid still images;
   wherein the method is performed using one or more processors.

2. The method of claim 1, wherein the set of overlaid still images are generated sequentially.

3. The method of claim 1, further comprising:
   transmitting a completion notification to a computing device after generating each overlaid still image of the set of overlaid still images.

4. The method of claim 1, wherein the one or more overlays includes at least one selected from a group consisting of an object overlay, a geography overlay, and an entity overlay.

5. The method of claim 1, wherein the drawing one or more overlays comprises drawing at least one overlay of the one or more overlays on one still image of the plurality of still images, wherein the at least one overlay includes at least one selected from a group consisting of an object overlay and a geography overlay.

6. The method of claim 1, wherein the request includes an image format, wherein the generating a plurality of still images comprises generating the plurality of still images in the image format.

7. The method of claim 1, wherein the request includes a video format, wherein the video is generated in the video format based upon the set of overlaid still images.

8. The method of claim 1, further comprising:

playing the plurality of still images corresponding to the plurality of video frames in the video section inside the headless browser with a frame control.

9. The method of claim 8, wherein the request includes a parameter associated with the frame control.

10. A method for generating a video for exporting, comprising:

receiving an export request of a video section from a requestor device;

providing the export request to an export application;

receiving a completion notification for each overlaid still image of a plurality of overlaid still images, the each overlaid still image of the plurality of overlaid still images being generated based on a video frame in the video section and one or more overlays, the each overlaid still image of the plurality of overlaid still images being generated by drawing the one or more overlays on the video frame when playing the video frame inside a headless browser;

in response to receiving the completion notification, downloading the each overlaid still image of the plurality of overlaid still images; and generating the video using the plurality of overlaid still images;

wherein the method is performed using one or more processors.

11. The method of claim 10, further comprising:

transmitting the video to the requestor device.

12. The method of claim 11, wherein the transmitting the video to the requestor device comprises transmitting a message comprising a link to the video to the requestor device.

13. The method of claim 10, wherein the one or more overlays includes at least one selected from a group consisting of an object overlay, a geography overlay, and an entity overlay.

14. The method of claim 10, wherein the providing the export request to an export application comprises:

accessing the headless browser; and navigating to an access point of the export application inside the headless browser.

15. A computing device, comprising:

one or more memories having instructions stored thereon; and one or more processors configured to execute the instructions and perform the operations comprising:

receiving an export request of a video section from a requestor device;

providing the export request to an export application;

receiving a completion notification for each overlaid still image of a plurality of overlaid still images, the each overlaid still image of the plurality of overlaid still images being generated based on a video frame in the video section and one or more overlays, the each overlaid still image of the plurality of overlaid still images being generated by drawing the one or more overlays on the video frame when playing the video frame inside a headless browser;

in response to receiving the completion notification, downloading the each overlaid still image of the plurality of overlaid still images;

generating a video using the plurality of overlaid still images.

16. The computing device of claim 15, wherein the operations further comprise:

transmitting the video to the requestor device.

17. The computing device of claim 16, wherein the transmitting the video to the requestor device comprises transmitting a message comprising a link to the video to the requestor device.

18. The computing device of claim 15, wherein the one or more overlays includes at least one selected from a group consisting of an object overlay, a geography overlay, and an entity overlay.

19. The computing device of claim 15, wherein the providing the export request to an export application comprises:

accessing the headless browser; and navigating to an access point of the export application inside the headless browser.

* * * * *